J. E. WELLING.
RAIN SPOUT FILTER.
APPLICATION FILED AUG. 4, 1906.
943,106.
Patented Dec. 14, 1909.
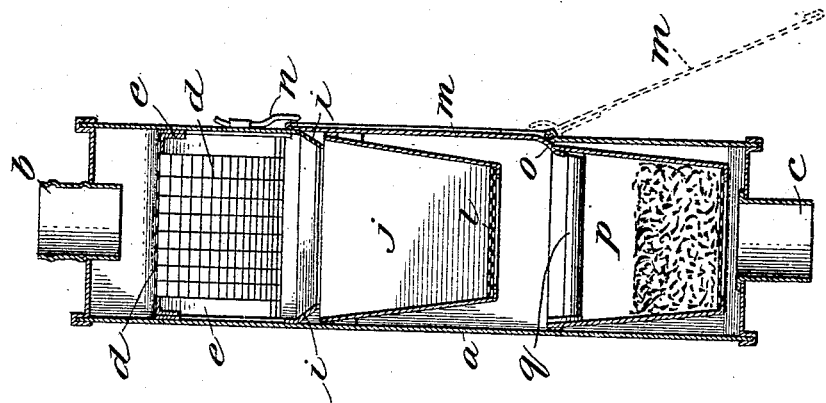
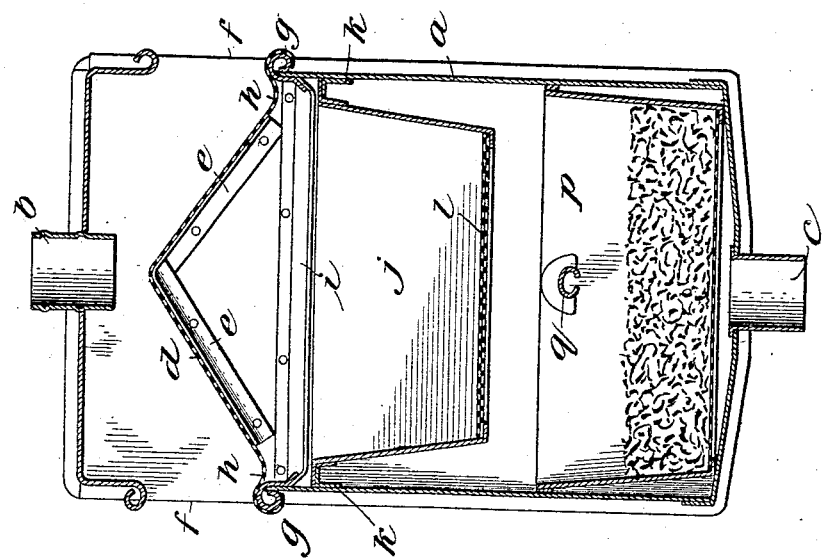
Witnesses:
Inventor:
J. E. Welling,
By Davis & Davis,
Attorneys.

UNITED STATES PATENT OFFICE.

JOHN E. WELLING, OF CYNTHIANA, KENTUCKY, ASSIGNOR TO R. M. WEBSTER, OF SPOKANE, WASHINGTON, AND H. C. NORRIS, JR., OF CYNTHIANA, KENTUCKY.

RAIN-SPOUT FILTER.

943,106.  Specification of Letters Patent.  Patented Dec. 14, 1909.

Application filed August 4, 1906. Serial No. 329,223.

*To all whom it may concern:*

Be it known that I, JOHN E. WELLING, a citizen of the United States of America, and resident of Cynthiana, county of Harrison, State of Kentucky, have invented certain new and useful Improvements in Rain-Spout Filters, of which the following is a full and clear specification, reference being had to the accompanying drawing.

The object of this invention is to provide a simple, inexpensive, durable, compact and easily-cleaned strainer and filter for rain-spouts, as more fully hereinafter set forth.

To the accomplishment of this object and such others as may hereinafter appear, the invention consists of the parts and combination of parts hereinafter fully described, and particularly pointed out in the appended claim, reference being had to the accompanying drawings forming a part of this specification, in which the same reference characters designate like parts throughout the several views.

In the drawings, Figure 1 represents a vertical sectional view of the apparatus, and Fig. 2 a vertical sectional view taken at right angles to the line on which Fig. 1 is taken.

Referring to the drawing annexed by reference-characters, $a$ designates the casing which is substantially rectangular and is constructed of suitable sheet metal, the inlet spout $b$ entering at the top of the casing and the outlet $c$ being connected to the center of the bottom of the casing. Within the upper part of the casing is supported a screen $d$ for preliminarily straining off the foreign bodies that may come down from the roof with the water, such as chips, twigs, leaves, etc. This screen extends entirely across the casing so that all the water that passes through the casing must pass through this screen. It is supported at its side edges upon inwardly-extending flanges $e$ which incline upwardly toward the center of the casing so that when the screen is bent to rest on them the screen will present a double-inclined surface to the down-coming water, the apex of this double incline being directly under the inlet $b$. These inclined faces of the screen slope downwardly and outwardly toward openings $f$ in the opposite sides of the casing.

The end of each inclined part of the screen curves down over a bead $g$ attached to the lower edge of the opening $f$, and near this discharge end of the screen the screen is depressed as at $h$, this depression coming just within the discharge opening, so that whatever water is deflected down the faces of the screen will be discharged through these depressed channels $h$ and not out over the discharge edges of the screen. It will be observed that the twigs and other foreign bodies will be swept down the inclined faces of the screen and out through the openings $f$, while the water by reason of the aforesaid depressions $h$, and especially when there is a heavy downpour of rain, will all be directed down through the casing to the outlet. Just below the preliminary screen described above is a flange $i$ which extends around the four sides of the casing and is inclined downwardly and inwardly so as to discharge into a receptacle $j$ suspended within the casing upon flanges $k$ affixed to the opposite sides of the casing. This receptacle is bottomed with one or more wire screens $l$ or a finer mesh than the preliminary screen $d$, so as to thereby further strain the water. This screen $l$ is supported in a receptacle, as shown, because of the fact that it is of a finer mesh than the preliminary screen (being designed to catch such fine particles as pass through the preliminary screen) which will in a heavy rain cause the water to accumulate to some extent above this screen, and for the further reason that the foreign matter strained out should be retained in such a manner as to be easily removed from the casing from time to time. This pan $j$ may be slid out laterally through an opening in one of the side walls which is normally closed by a door $m$, this door being held in a locked position by a simple sliding-bolt $n$. This door is hinged to the main casing at its lower edge, and a flange $o$ is provided along it lower edge to deflect the falling water past the hinged joint and thereby prevent leakage at this joint.

In the bottom of the casing is loosely placed another pan or receptacle $p$ provided with a transverse handle $q$ and with a suitable screen across its open bottom. This pan substantially fills the lower part of the casing so that all the water which passes down through the vessel $j$ must empty into this pan. A suitable filtering and purifying material, such as charcoal, is placed in this pan to finally strain and filter the liquid before it passes out through the outlet. This pan may be readily removed after the pan $j$ is removed by simply lifting it far enough to bring it in line with the door opening through which the pan $j$ was removed.

It will be observed that the above described construction provides an exceedingly compact and inexpensive as well as efficient apparatus.

A special feature lies in the manner of supporting and constructing the preliminary screen whereby all the foreign bodies will be discharged while the water, even in a heavy downpour of rain will be all sent down through the filter and thus be prevented from splashing or spilling out through the discharge openings $f$. By extending the ends of the screen out through the openings and coiling them around the beads $g$ and supporting the side edges of the screen upon the ledges or flanges $e$ it is unnecessary to solder or otherwise fasten the screen in place, so that it may be readily removed to enable its meshes to be cleaned out should they become clogged.

Another feature lies in so disposing the receptacles in the casing that they may both be very conveniently removed through the same opening and also so that the water shall be permitted to pass straight down through the apparatus without being deflected or obstructed any more than is absolutely necessary to screen and filter it.

Having thus fully described my invention, what I claim and desire to secure by Letters Patent is:—

In combination, a casing provided with an inlet at its top and an outlet at its bottom and also opposite side discharge openings near its top, the lower edge of each of these openings being provided with a horizontal bead extending outwardly, inwardly extending flanges on the inner walls of the casing and inclining from the middle downwardly and outwardly toward said beads, an A-shaped screen supported on said flanges and extending downwardly and outwardly in opposite directions from a point below the inlet, the outer edges of this screen being removably coiled downwardly around under said beads, whereby said screen may be removed at will through either of said side discharge openings, and removable filtering devices below said screen.

In testimony whereof I hereunto affix my signature in the presence of two witnesses this 31 day of July 1906.

JOHN E. WELLING.

Witnesses:
H. C. NORRIS, Jr.,
CHESTER M. JEWETT.